Jan. 11, 1927.
W. H. BAHAN
1,613,920
CRANK SHAFT GEAR FOR LOOMS
Filed March 17, 1926
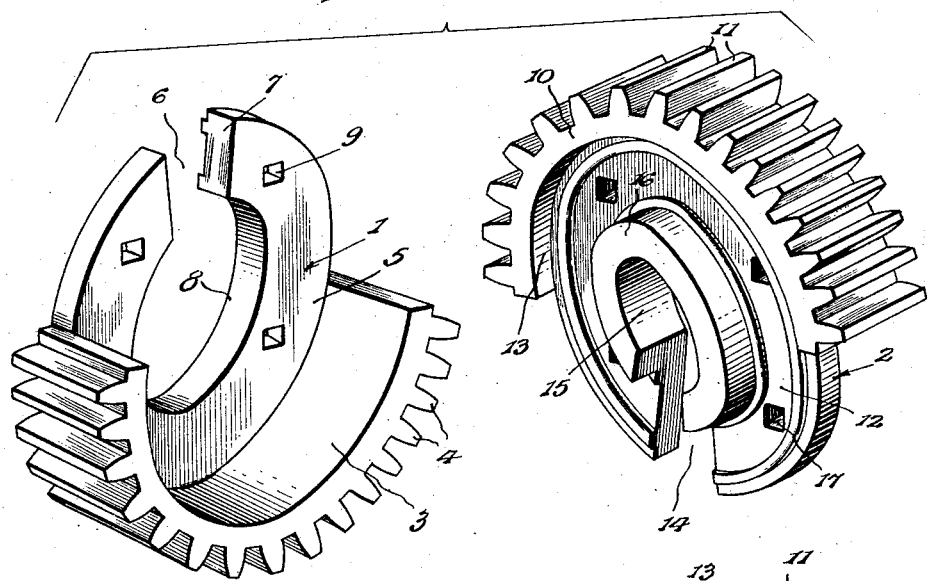
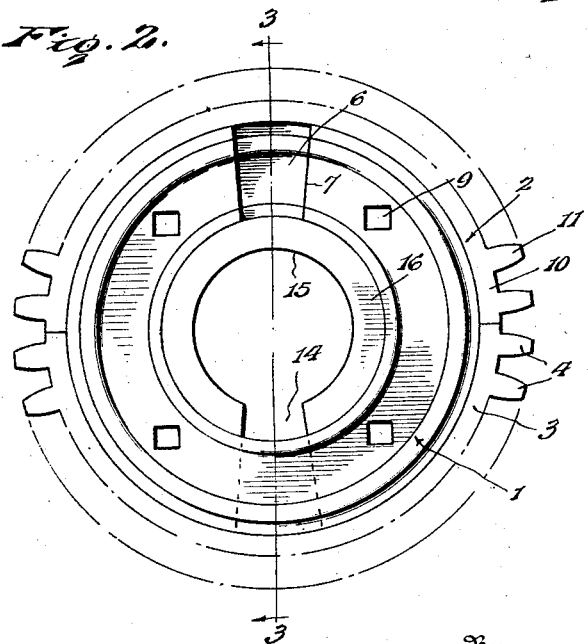
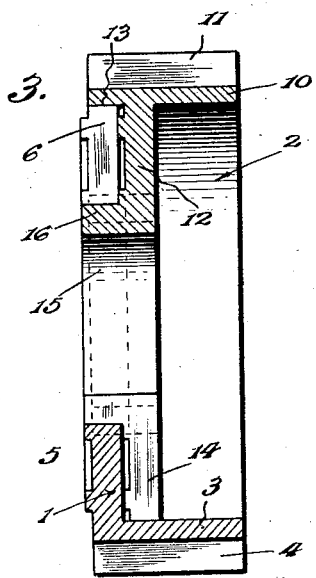
Inventor
William H. Bahan.
By Lacey & Lacey,
Attorneys Patented Jan. 11, 1927.

1,613,920

UNITED STATES PATENT OFFICE.

WILLIAM H. BAHAN, OF GREENVILLE, SOUTH CAROLINA.

CRANK-SHAFT GEAR FOR LOOMS.

Application filed March 17, 1926. Serial No. 95,401.

This invention relates to improvements in crank shaft gears for looms and more particularly to that type comprising sections adapted to be assembled about the crank shaft and fitted to the hub thereon and secured to the drive pulley upon said shaft. It is a well known fact that such gears are subjected to considerable wear for a portion of their peripheries and that such gears have their teeth which are located at this portion broken or worn away to such an extent that replacement is required, and inasmuch as the space is somewhat restricted, it has been customary to form such gears in sections in order that they may be replaced from time to time without the necessity of taking down the crank shaft, the section of such a gear which carries the teeth which are subjected to the greatest wear, being usually removed from the other section which is permitted to remain in place, and a new section substituted for the same. Therefore, it is one of the objects of the present invention to provide a crank shaft gear for looms so constructed that such section may be readily removed and a replacement section substituted therefor without any appreciable difficulty and with little loss of time and labor.

In the construction of loom parts, it is desirable if not essential that the parts be so constructed that the operation of the loom will be steady and the motion of each part uniform, and, therefore, the present invention has as another object, to so construct the gear that the same will be balanced so that its operation will be of a steady and uniform character, thus insuring of transmission of motion in a steady and uniform manner to the operating parts of the loom which are driven from the said gear.

Another object of the invention is to so construct the gear that when the sections thereof are assembled with each other, the sections will be precisely centered so that the toothed rim of the gear will be uniform throughout and so that there can be no relative displacement of the sections after they have once been properly assembled.

Another object of the invention is to so construct the gear sections that the replaceable section may be replaced, when occasion requires, without any of the difficulties ordinarily experienced in performing this task because of the restricted space in which the replaceable section must be manipulated in assembling it with the section which is substantially permanent.

Another object of the invention is to provide a gear for the purpose stated which will be more substantial in its construction than the ordinary gear and in which all of the bolts which are employed in securing such a gear to the drive pulley will pass through both of the sections so as to further insure against any relative displacement of the sections and produce a practically integral gear.

In the accompanying drawings:

Figure 1 is a group perspective view illustrating the two sections of the gear embodying the invention, relatively separated.

Figure 2 is a view in side elevation of the gear, the sections thereof being assembled.

Figure 3 is a vertical diametric sectional view taken substantially on the line 3—3 of Figure 2, looking in the direction indicated by the arrows.

The gear embodying the invention comprises two sections, one indicated in general by the numeral 1 and the other in general by the numeral 2, and the said section 1 comprises a substantially semi-annular rim 3 provided exteriorly with the usual teeth 4, the rim extending peripherally about and being integrally formed with a web 5 which is of substantially circular form. The web 5 is, however, provided with a recess 6, the walls 7 of which extend substantially radially with respect to the axis of the section, the said web being likewise provided concentrically with an opening 8 to accommodate a portion of the gear section 2, as will presently be explained, the recess 6 extending between the said opening 8 and the periphery of the web and being located diametrically opposite the intermediate or central portion of the rim 3 or, in other words, substantially midway between the ends of the said rim. At this point it may be stated that the recess 6 is of a width sufficient to adapt the gear section 1 to be fitted over the crank shaft of the loom, and the outer face of the web 5 is in the same plane as the corresponding side of the rim 3. The web 5 is formed with a series of openings, preferably four in number, indicated by the numeral 9, which openings are equi-distantly spaced with respect to one another and about the opening 8 and symmetrically located with respect to the recess 6 and the ends of the rim 3, these openings accommodating the usual bolts (not shown) which serve to secure the usual gear to the drive pulley or the friction plate, as the case may be, upon the crank shaft of the loom.

The gear section 2 comprises a semi-annular rim 10 corresponding to the rim 3 of the section 1 and provided with the usual teeth 11 upon the outer side thereof, the toothed rims 3 and 10 matching at their ends when the sections are assembled. The rim 10 extends about one-half the circumference of a web 12 with which it is integrally cast and which web is substantially of the circular form possessed by the web 5 of the section 1, the web 12, however, being spaced or offset inwardly from one side of the rim 10 so as to provide a recess 13 in one face of the section 2, of a depth and diameter to accommodate the web 5 of the section 1. More specifically, the recess 13 accommodates that portion of the web 5 which projects opposite the rim 3 of the section 1, and it will be evident that when the two sections are assembled, the side of the rim 10 with respect to which the web 12 is inwardly offset, will occupy the same plane as the outer face of the web 5 and the corresponding side of the rim 3, thereby providing a symmetrical assemblage. The web 12 of the section 2 is formed with a recess 14, the walls of which extend substantially radially with respect to the axis of the section and this recess provides for fitting of the section 2 over the crank shaft, and, as in the case of the recess 6, the recess 14 is located diametrically opposite a point midway between the ends of the toothed rim 10 of the section 2, so that when the two sections are assembled as shown in Figures 2 and 3 of the drawings, the recesses 6 and 14 will be located diametrically opposite each other and the gear structure will, therefore, be a balanced one.

The web 12 is formed concentrically with an opening 15 which is of a diameter to snugly fit the usual hub (not shown) upon the crank shaft, and the face of the web 12 which is presented to the web 5 is formed with an approximately annular flange 16 of a depth equal to the thickness of the web 5 and exteriorly of a diameter to snugly fit within the opening 8 in the said web 5 when the sections are assembled, the recess 14 communicating with the opening 15 in the same manner that the recess 6 communicates with the opening 8 in the web of the section 1. Bolt openings 17 are formed in the web 12 and are concentrically arranged in a series about the flange 16 and said openings 17 are symmetrically arranged with respect to the recess 14 and the ends of the toothed rim 10 so that they will register with the openings 9 when the two sections are assembled.

In the assembled relation of the sections comprising the gear, the web 5 of the section 1 will, as stated, be received within the recess of the section 2 and against the face of the web 12 thereof, so that the ends of the rims 3 and 10 will meet, and so that the flange 16 will fit snugly within the opening 8 and the bolt openings 9 and 17 will register, the recesses 6 and 14 being diammetrically oppositely located, as shown in Figures 2 and 3. The section 1 has its web disposed directly against the side of the drive pully or friction plate, as the case may be, and the two sections, in their assembled relation, are secured to the said pully or friction plate by the usual bolts which are engaged through registering bolt openings in the two sections. It will be evident that by loosening these bolts, the section 2 may be separated from the section 1 and from the crank shaft and likewise the section 1 may be readily removed if its removel is required. It will also be evident from the foregoing that due to the symmetrical arrangement of the sections when assembled, the gear as a whole is balanced so that it will impart motion to the loom mechanism in a steady manner and without tending to cause any uneven rotation of the crank shaft.

Having thus described the invention, what I claim is:

A gear of the class described comprising a pair of companion sections each including a substantially circular web having a central opening and a recess extending therebetween and the periphery of the web, and a toothed semi-annular rim extending around the periphery of the web opposite the recess, the web of one section being offset inwardly from the plane of one side of its respective rim to provide a recess of a depth to accommodate the web of the other section, the sections having registering openings in their said webs for the passage of securing bolts, two of the openings in each web being equidistantly spaced from opposite sides of the recess in the web and other openings in each web being equi-distantly spaced from each other and from the respective ones of the first mentioned openings and on a chordal line diammetrically opposite the recess.

In testimony whereof I affix my signature.

WILLIAM H. BAHAN. [L. S.]